(12) United States Patent
Bhatia et al.

(10) Patent No.: US 11,909,716 B1
(45) Date of Patent: Feb. 20, 2024

(54) LOCATOR LOOKUP-BASED, LOW-LATENCY, MULTI-ACCESS IP MOBILITY

(71) Applicant: Nokia Solutions and Networks Oy, Espoo (FI)

(72) Inventors: Randeep Bhatia, Green Brook, NJ (US); Steven Benno, Towaco, NJ (US); Fang Hao, Morganville, NJ (US); Yu Mi, Cleveland, OH (US); T V Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/063,314

(22) Filed: Dec. 8, 2022

(51) Int. Cl.
  *G06F 7/02* (2006.01)
  *H04L 45/586* (2022.01)
  *H04L 61/5007* (2022.01)
  *H04L 61/5046* (2022.01)

(52) U.S. Cl.
  CPC ...... *H04L 61/5007* (2022.05); *H04L 61/5046* (2022.05)

(58) Field of Classification Search
  None
  See application file for complete search history.

(56) References Cited

U.S. PATENT DOCUMENTS

| | | | | |
|---|---|---|---|---|
| 7,478,109 B1 * | 1/2009 | Panigrahy | ......... | H04L 45/74591 |
| 9,979,595 B2 * | 5/2018 | Choudhury | ......... | H04L 41/0806 |
| 11,356,501 B1 * | 6/2022 | Hashisho | ............. | G08G 5/0013 |
| 2005/0163122 A1 * | 7/2005 | Sahni | ...................... | H04L 45/50 370/392 |
| 2010/0046399 A1 * | 2/2010 | Kakivaya | ............ | H04L 61/4541 370/254 |
| 2011/0016223 A1 | 1/2011 | Iannaccone et al. | | |
| 2013/0094404 A1 * | 4/2013 | Van Wyk | ................ | H04L 45/48 370/256 |
| 2022/0377012 A1 * | 11/2022 | Doddapaneni | ...... | H04L 61/2503 |

OTHER PUBLICATIONS

Gundavelli, S., et al. "Proxy Mobile IPv6." RFC 5213, Internet Engineering Task Force (Aug. 2008): 1-92.

(Continued)

*Primary Examiner* — Christopher B Robinson
(74) *Attorney, Agent, or Firm* — Mendelsohn Dunleavy, P.C.; Steve Mendelsohn

(57) ABSTRACT

Leaf nodes of a tree structure, also having a root node and intermediate nodes, communicate with endpoints via access networks and store mappings from permanent virtual IP (VIP) addresses for the endpoints to physical IP (PIP) addresses for the endpoints on the access networks. The root node and intermediate nodes store pointers for the endpoints' leaf nodes and associated access networks. When a connection setup request (CSR) for a destination endpoint is received from a corresponding node, the receiving leaf node passes the CSR up through the tree structure to a lowest common ancestor (LCA) node for the receiving leaf node and one or more destination leaf nodes associated with the destination endpoint. The LCA node uses its pointers to pass the CSR down towards the one or more destination leaf nodes, which use the corresponding VIP-to-PIP mappings to forward the CSR to the destination endpoint.

19 Claims, 7 Drawing Sheets

(56) References Cited

OTHER PUBLICATIONS

Perkins, C., et al. "Mobility Support in IPv6." RFC 6275, Internet Engineering Task Force (Jul. 2011): 1-169.

Liebsch, M., et al. "Proxy Mobile IPV6 (PMIPv6) Localized Routing Problem Statement." RFC 6279, Internet Engineering Task Force (Jun. 2011): 1-14.

Farinacci, D., et al. "The Locator/ID Separation Protocol (LISP)." RFC 6830, Internet Engineering Task Force (Jan. 2013): 1-75.

Herbert, Tom. "Identifier-locator addressing for IPV6." Internet Draft, Internet Engineering Task Force. Version draft-herbert-nvo3-ila-03 (Oct. 2016): 1-44.

Tsubouchi, Koji, et al. "Anchorless Routing for URLLC Services in 5G Network." 2018 IEEE 88th Vehicular Technology Conference (VTC—Fall), Chicago, IL, USA. (2018): 1-5.

FDIO, "Vector Packet Processing." Repository, <URL: https://github.com/FDio/vpp> (2015): 4 pages.

Hochbaum, Dorit S., et al. "A Unified Approach to Approximation Algorithms for Bottleneck Problems." Journal of the Association of Computer Machinery 33.3 (1986): 533-550.

Fakcharoenphol, Jittat, et al. "A Tight Bound on Approximating Arbitrary Metrics by Tree Metrics." Proceedings of the 35th Annual ACM Symposium on Theory of Computing. San Diego, CA, USA (Jun. 2003): 1-8.

Bhatia, Randeep, et al. "In-Network Solution for Low-Latency Communications Using Segment Routing", U.S. Appl. No. 18/063,302, filed Dec. 8, 2022 (29 pages).

\* cited by examiner

100

LOCATOR LOOKUP-BASED, LOW-LATENCY, MULTI-ACCESS IP MOBILITY

BACKGROUND

Field of the Disclosure

The present disclosure relates to wireless communication systems.

Description of the Related Art

This section introduces aspects that may help facilitate a better understanding of the disclosure. Accordingly, the statements of this section are to be read in this light and are not to be understood as admissions about what is prior art or what is not prior art.

With the proliferation of low latency, privacy-sensitive applications, key data-processing functions are getting relocated from the network center to the network edge, closer to where data is gathered and delivered to end-users. Various public cloud providers, telcos, networking vendors, industrial companies, enterprises, and edge startups are gearing up to address this emerging need for edge computing and networking. With the availability of a multitude of operator-managed, public cloud-hosted, on-premises, telco slice-based edge networks, there is likely to be a greater choice of network connectivity for edge applications. This is in addition to the various wireless connectivity options available through cellular, Wi-Fi, and satellite technologies in the access network that is facilitated by increasing support for multiple radios on edge devices. The edge is truly becoming a network of networks.

Current IP and cellular mobility mechanisms rely on static, centralized mobility anchors that introduce inefficiencies from triangular routing. This can be a problem for low-latency edge applications. Using static mobility anchors can also be a problem for inter-network and inter-access mobility needed to take advantage of the diversity of edge networks and access technologies. Another problem is that IP addresses can dynamically change based on endpoints' use of different networks and access technologies. Hence, IP addresses cannot be relied upon for routing, connection setup, and authorization purposes.

SUMMARY

To address these problems, this disclosure propose new protocols and systems with one or more of the following unique ideas and characteristics:
  Use of a unique identifier (e.g., a fixed IP address aka virtual IP address) for each endpoint that can be used for discovery, connection setup, authorization, and routing;
  Novel tree embedding-based scalable endpoint identifier (e.g., virtual IP address) to locator (physical IP address) translation algorithms for low-latency connection setup (DNS-like but with SRv6-based fast network forwarding)—with novel hierarchical, low-latency embeddings of the internet AS (autonomous system) graph;
  Novel use of SRv6 for low-latency connection setup over direct paths that avoids the use of inefficient triangular routing through static, centralized anchors;
  End-host-based mobility mechanisms for distributing network-connectivity information and for sending network-connectivity updates to endpoints with active sessions (using SRv6 and eBPF);
  Flexible, per connection, access-network selection decisions that can be telemetry and network/endpoint policy-driven (latency-based, load-balanced, cost-based, etc.);
  Seamless, disruption-free switching of access networks (using eBPF and SRv6); and
  Seamless network authentication/authorization of mobile endpoints (as well as verification of source of app packets through integrity check) using their unique and verifiable identifiers (e.g., as a public key/certificate).

In one embodiment, the present disclosure is a system having a tree structure comprising a root node connected to a plurality of leaf nodes via a plurality of intermediate nodes. Each leaf node and each intermediate node has a corresponding parent node in the tree structure, and the root node and each intermediate node has at least one corresponding child node in the tree structure. A first leaf node is configured to communicate with a destination endpoint via a first access network, wherein the first leaf node is configured to store a first mapping from a permanent virtual IP (VIP) address for the destination endpoint to a first physical IP (PIP) address for the destination endpoint on the first access network. A second leaf node is configured to communicate with the destination endpoint via a second access network different from the first access network, wherein the second leaf node is configured to store a second mapping from the VIP address for the destination endpoint to a second PIP address for the destination endpoint on the second access network, the second PIP address being different from the first PIP address. The root node is configured to store (i) a first root-node pointer pointing to a first intermediate node for the destination endpoint and the first access network and (ii) a second root-node pointer pointing to either the first intermediate node or a different intermediate node for the destination endpoint and the second access network. The first intermediate node is configured to store at least a first intermediate-node pointer pointing to a first child node for the destination endpoint and the first access network, wherein the first intermediate node is configured to use at least the first intermediate-node pointer to forward, towards the destination endpoint, a connection setup request (CSR) for the destination endpoint received from a corresponding node.

In one embodiment, the present disclosure is a destination endpoint comprising (i) a first interface configured to communicate via a first access network with a first leaf node of a system having a tree structure and (ii) a second interface configured to communicate via a second access network, different from the first access network, with a second leaf node of the system, different from the first leaf node. The destination endpoint is configured to receive, at the first interface, a first copy of a connection setup request (CSR) transmitted by a corresponding node to the system and then transmitted by the first leaf node to the destination endpoint, and the destination endpoint is configured to receive, at the second interface, a second copy of the CSR transmitted by the second leaf node to the endpoint.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Basic Architecture

Figure 1:
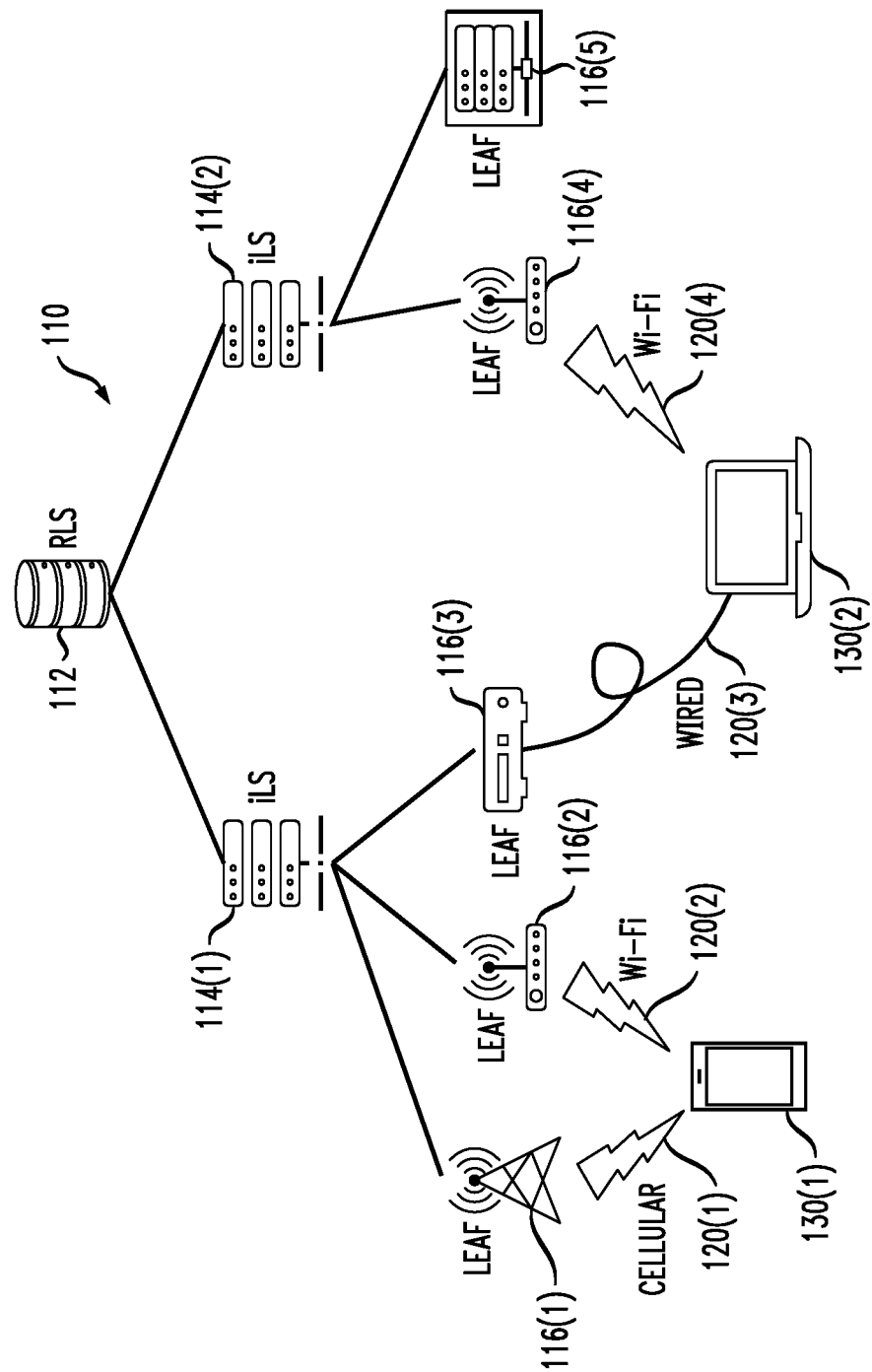
FIG. 1 is a simplified block diagram of a communication (comm) network according to an embodiment of the disclosure.

FIG. 1 is a simplified block diagram of a communication (comm) network 100 according to an embodiment of the disclosure. In particular, comm network 100 includes a hierarchical, tree-based, locator lookup provider (LLP) system 110 comprising a highest-level LLP server 112 (referred to as the "root node") and a number of (in this case, five) lowest-level LLP servers 116 (referred to as "leaf nodes") connected to the root LLP server 112 by one or more layers of mid-level LLP servers 114 (referred to as "intermediate nodes") (in this case, one layer of two intermediate nodes 114). A leaf node 116 may be a standalone physical server or a virtual server that can be embedded within a router, cellular base station, or set top box.

As shown in FIG. 1, the comm network 100 also includes a number of (in this case two) endpoints 130, where endpoint 130(1) is a mobile phone and endpoint 130(2) is a laptop computer. As indicated in FIG. 1, mobile phone 130(1) is capable of communicating with (i) leaf node 116(1) (a cellular base station) via a wireless cellular access network 120(1) and with (ii) leaf node 116(2) (a Wi-Fi router) via wireless WiFi access network 120(2). Similarly, laptop 130(2) is capable of communicating with (i) leaf node 116(3) (a set-top box) via a wired access network 120(3) and with (ii) leaf node 116(4) (another Wi-Fi router) via wireless WiFi access network 120(4). Note that, in FIG. 1, leaf node 116(5) is a standalone server that is not embedded in another network node, such as a base station, access point, router, or set top box.

Those skilled in the art will understand that, in general, LLP system 110 may have (i) one or more intermediate layers, each layer having one or more intermediate nodes 114, and (ii) any number of (physical or virtual) leaf nodes 116 at edge sites of the LLP system 110 that are embedded within access points, routers, and base stations of access networks 120 that are capable of communicating with endpoints 130 using different, suitable wired, wireless, and/or optical modes of communication.

The following embodiment is implemented in the context of an IPv6 network with segment routing (SRv6) support in the endpoints 130. The SRv6 support can be added to the endpoints 130 through eBPF (extended Berkeley Packet Filter), which does not require any kernel changes. In this eBPF-based implementation, the endpoints 130 are capable of inserting SRv6 segments in the packet headers (of the application packets). The embodiment also makes use of SRv6 for forwarding packets to the endpoints 130 through the LLP system 110 of FIG. 1. SRv6 support can also be implemented using other mechanisms, such as some OS kernel or virtual software switches.

Identifier-to-Locator Mapping

In highly dynamic, multi-operator, multi-network, multi-access edges with mobile endpoints 130, the network connectivity of the endpoints 130 and hence their physical IP (PIP) addresses can continuously change. As a result, PIP addresses cannot be relied upon for routing, connection setup, and authorization purposes. Instead, according to this disclosure, endpoints 130 are assigned an identity that is independent of their dynamic and ephemeral network addresses or locators (i.e., independent of their PIP addresses). In certain embodiments, each endpoint 130 is assigned an immutable identity in the form of a unique, fixed, virtual IP (VIP) address (aka identifier), which is used for connection setup and routing instead of its highly dynamic PIP addresses (aka locators).

Certain embodiments of the disclosure support a flexible identifier-to-locator (i.e., VIP-to-PIP) lookup mechanism for looking up the endpoint's current PIP address based on its permanent VIP address. This lookup mechanism is used because connections to endpoints 130 are initiated to their VIP addresses, but connection setup requests are delivered to endpoints 130 on their PIP addresses.

Figure 3:
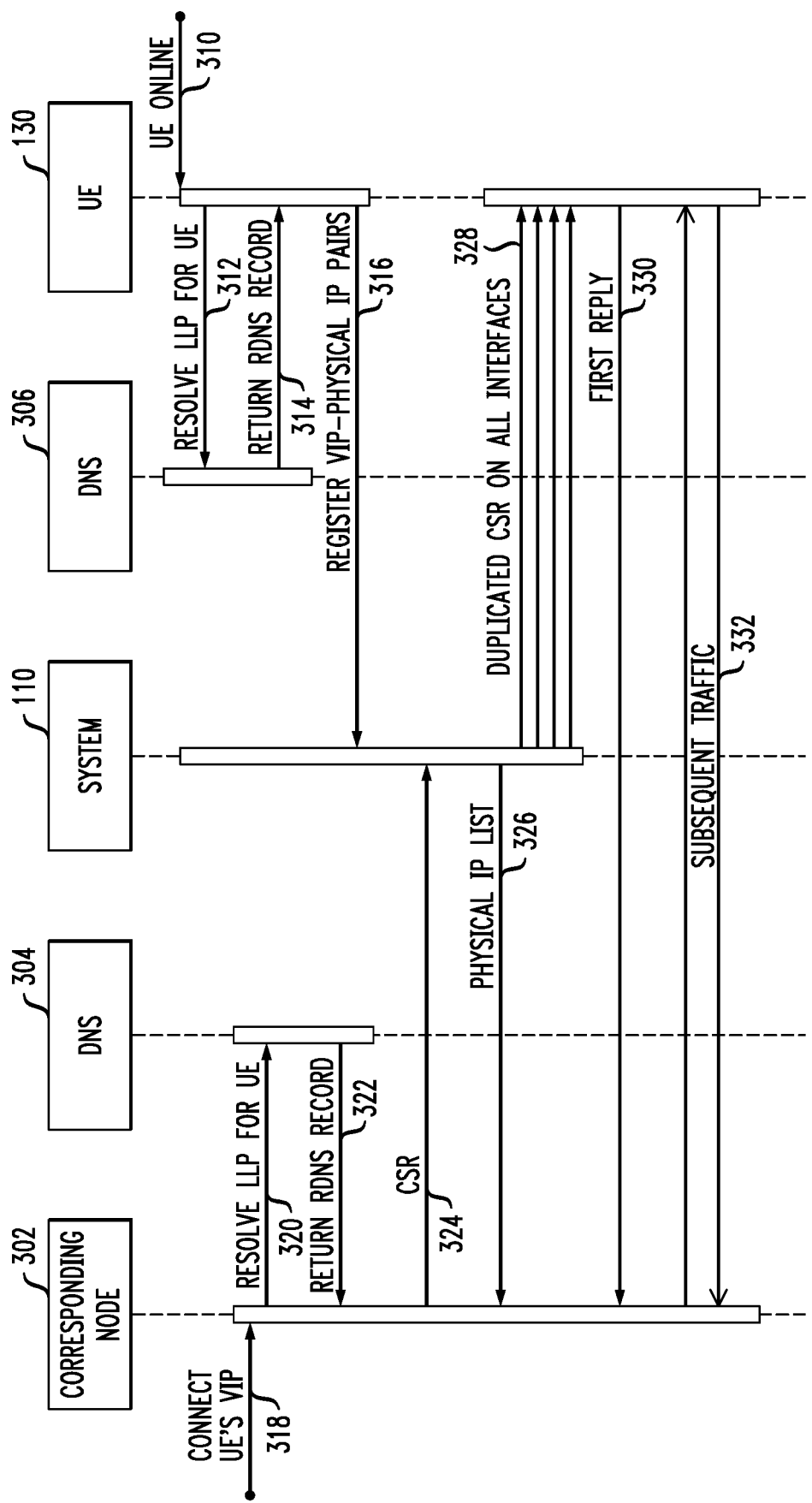
FIG. 3 is a signal flow diagram representing a DNS-based approach for service discovery and registration for an endpoint and a corresponding node of the LLP system of FIG. 1.
Figure 4:
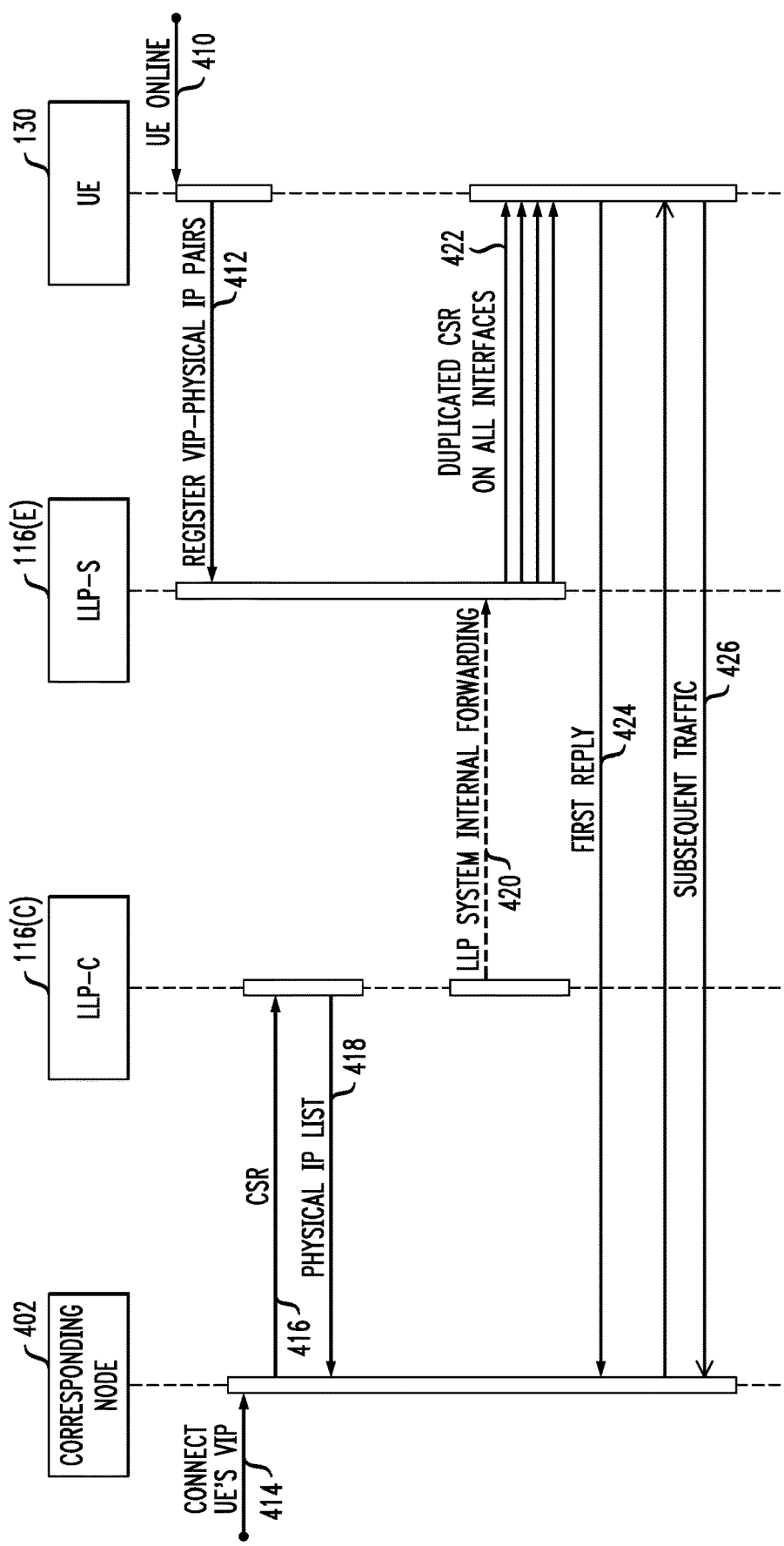
FIG. 4 is a signal flow diagram representing a BGP anycast-based approach for service discovery and registration for an endpoint and a corresponding node of LLP system of FIG. 1.

The identifier-to-locator lookup mechanism is supported through a locator lookup provider system, such as the LLP system 110 of FIG. 1. An LLP server, such as any of the nodes 112, 114, and 116 of FIG. 1, maintains the current VIP-to-PIP mapping of all endpoints 130 that are registered with that LLP server. Each endpoint 130 reports to its one or more registered LLP servers any changes to its PIP address. As described further below, FIGS. 3 and 4 depict an endpoint 130 registering its VIP-to-PIP mapping with an LLP server.

An endpoint 130 of the LLP system 110 can be any device registered with the LLP system 110 that connects to the Internet using one or more access networks 120, such as Wi-Fi, LTE, etc. An endpoint 130 can be mobile, and the PIP address for its migrated access network 120 could change due to the dynamic allocation of physical IP addresses. However, each endpoint 130 also has a unique VIP address that never changes. For this reason, endpoints 130 are accessed only through their VIP addresses. Since an endpoint 130 might have multiple access networks 120, such an endpoint 130 differentiates each access network 120 by assigning it a different network ID (nID). As used herein, the term "corresponding node" refers to any node that initiates a connection to an endpoint 130 served by the LLP system 110. A corresponding node may itself be, but does not have to be, an endpoint 130 of the LLP system 110.

A corresponding node sends a connection setup request (CSR) to an endpoint 130 via the LLP system 110. In some embodiments, the LLP system 110 is a highly distributed system with a local presence in major Point-of-Presence (PoP) sites. This ensures that messages sent to the LLP system 110 incur very low latency. Various methods, e.g., based on Domain Name System (DNS) lookup, Border Gateway Protocol (BGP) anycast, etc., can be used for this low-latency forwarding of a CSP to the nearby LLP PoP.

The discussion further below shows how efficient LLP lookup and connection setup forwarding can be implemented using a combination of algorithmic (tree-based, hierarchical embeddings) and networking techniques (SRv6, eBPF). The following are characteristics of an efficient implementation of the LLP system 110:

Connection setup latency, including the locator's lookup latency, and the latency on the path used for connection setup is low. Specifically, low-latency connection setup paths is used for endpoints 130 that are relatively close to each other (e.g., within the same or nearby edge location). Note that this supports low-latency services within edge locations that are not possible to achieve with centralized, static mobility anchors;

Highly accuracy: any change in an endpoint's PIP address is quickly reflected in the locator lookup for subsequent connection setups. Caches that can go stale are avoided so that the information provided is always accurate; and Operation at an Internet scale: the LLP system 110 is able to scale horizontally with locator lookup and connection setup request processing and forwarding load balanced across the different LLP servers.

Besides providing mapping service for an endpoint 130, the LLP system 110 could also be an intermediary for authorizing, authenticating, negotiating, and settling network usage charges on behalf of its users. For this, endpoint VIPs can serve as unique and verifiable public keys used for authentication. In addition, packets may be sent with integrity checks that can be verified using this public key.

The servers of LLP system 110 may be hosted by web-hosting companies and content delivery networks (CDNs) since they are already in the business of registering domain names for their users. Typically, there can be many independent LLP servers.

LLP System

The infrastructure of LLP system 110 supports locator registration, locator lookup, locator migration tracing, new locator addition, and locator deletion for the endpoints 130. The endpoints 130 register their PIP addresses with the LLP system 110 and update their PIP changes with the nID of the current access network 120. The LLP system 110 resolves PIP addresses for the endpoints 130 to establish a connection. The LLP system 110 also forwards connection setup requests to the PIP addresses of the endpoints 130.

LLP System Architectural Overview

The infrastructure of the LLP system 110 is a collection of LLP servers (i.e., root node 112, intermediate nodes 114, and leaf nodes 116) that follow a hierarchical architecture. More specifically, the servers of LLP system 110 are organized in a single tree structure that is responsible for the set of the endpoints 130. Note that, although not represented in FIG. 1, an LLP system may have a collection of tree structures, where a given endpoint 130 may be associated with more than one tree structure (i.e., more than one instance of LLP system 110).

LLP for locator registration: For given access to an endpoint 130, the up-to-date locator information (e.g., VIP-to-PIP mapping for the current access network 120 of the endpoint 130) is maintained in the one or more LLP servers on the path within the LLP system 110 from (i) a leaf node 116 that is close to the endpoint 130 to (ii) the root node 112. The endpoint 130 (or some network entity such as an access point associated with that endpoint 130) is responsible for timely registration of this locator information with the LLP system 110 via access registration messages. With the use of anycast or DNS (see FIGS. 3 and 4), the LLP system 110 ensures that an endpoint's access registration messages reach a nearby leaf node 116 (with low latency) on the current access network 120. As the endpoint 130 moves/changes access, the tree path in the LLP system 110 where information is stored for the endpoint 130 or the information itself can change, either because of the change in the closest leaf node 116 to the endpoint 130 on the current access network 120 or because of a change in the VIP-to-PIP mapping or because the endpoint's connection is lost or recovered to that access network 120. How registration updates are handled in the LLP system 110 is described further below.

LLP for connection setup: The LLP system 110 forwards connection setup requests (CSRs) received from corresponding nodes to the LLP system's registered endpoints 130. Using DNS or anycast (see FIGS. 3 and 4), a CSR from a corresponding node reaches a leaf node 116 of the LLP system 110 that is close to the corresponding node with respect to some network metric (e.g., latency). The VIP address in the CSR serves as a key for looking up the endpoint's current PIP address(es) for the one or more different access networks 120 the endpoint 130 is currently connected to. This lookup procedure involves forwarding the CSR through the LLP system 110, starting from the leaf node 116 that receives the CSR, first up towards the root node 112, and then down to the one or more associated leaf nodes 116 that maintain the endpoint's up-to-date link information (VIP-to-PIP mapping(s)). Note that, as described further below, depending on the endpoint location in the tree structure, the CSR might or might not reach the root node 112. The one or more associated leaf nodes 116 set the destination to the endpoint's PIP access address before forwarding the CSR to the endpoint 130 on the respective access links in turn. Typically, the CSR is forwarded to the endpoint 130 on all of its current interfaces to alleviate the impact of link drop due to mobility (depicted as Duplicated CSR in FIGS. 3 and 4). To further ensure reliability, the CSR is buffered for a short period of time by certain LLP servers so that the CSR can be re-sent when needed. The detailed CSR signaling is described further below.

Let u be the leaf node 116 where the CSR from the corresponding node enters the LLP system 110, and let v be the leaf node 116 that maintains the endpoint's link information (i.e., VIP-to-PIP mapping) in the LLP system 110 for a given access network 120. Let w be the lowest common ancestor (LCA) server of leaf nodes u and v in the LLP system 110. The LCA server is either the lowest-level intermediate node 114 that is shared by both leaf nodes u and v or the root node 112 in the case were the leaf nodes u and v have no shared intermediate node 114. For example, in the LLP system 110 of FIG. 1, intermediate node 114(1) is the LCA server for leaf nodes 116(1)-116(3), and intermediate node 114(2) is the LCA server for leaf nodes 116(4) and 116(5), while root node 112 is the LCA server for, for example, leaf nodes 116(2) and 116(5).) As shown below, the latency incurred for processing and forwarding the CSR to the endpoint 130 on access network 120 using the LLP system 110 is directly related to the latency of the unique LLP tree path $\{u,w,v\}$ from leaf node u up to LCA server w and down to leaf node v.

Note that, by the forwarding approach (e.g., DNS or anycast), leaf node u is close to the corresponding node, and v is close to the endpoint 130 on its access network 120. Hence, the latency $l\_\{u,v\}$ of the lowest-latency path between leaf nodes u and v can be a good approximation to the lowest possible latency between the endpoint 130 and the corresponding node for the endpoint's access network 120. In an ideal implementation of the LLP system 110, the latency of the path $\{u,w,v\}$ for leaf nodes u and v is close to the latency $l\_\{u,v\}$. This ensures the CSR latency in the LLP system 110 is close to the latency $l\_\{u,v\}$ and therefore to the lowest possible latency between the endpoint 130 and the corresponding node.

Tree Metric-Based Design of LLP System Infrastructure

The following sections describe techniques for designing the infrastructure of LLP system 110.

Algorithm for Selecting PoP Sites for LLP Servers

This section describes an algorithm for selecting a subset V of PoP sites where all of the LLP servers 112/114/116 in the LLP system 110 can be placed. These PoP sites should be selected so that every possible endpoint 130 has a low-latency path to at least one PoP site in the subset V.

The algorithm starts with an autonomous system (AS) graph of PoP sites that are used as peering points for autonomous systems, where the AS graph nodes are the PoPs and the AS graph links (u,v) have their latencies set to the BGP latency between PoP u to PoP v through the AS network (e.g., least-latency path based on BGP). An AS graph can be a good model of the internet or a portion of the internet where the LLP servers are to be deployed. Assuming each PoP site to be a candidate site for an LLP server and also assuming that any endpoint 130 is always within some autonomous system and is therefore close to at least one of its peering PoP sites, a subset V of PoP sites for LLP servers can be found as follows:

Let m be the maximum number of PoP sites that are allowed to be used to form LLP system 110. The value of m may be determined by the LLP system provider, perhaps based on their capex and opex budgets. For example, to keep their operational costs low, the provider may not want to deploy LLP servers in too many POP sites. The downside of having few POP sites is that there might not be any POP site close to some endpoints and, because of that, connection setup latency can be high for those endpoints.

Our goal is to pick a subset V of the PoP sites, such that $|V|<=m$ and for which the maximum latency D to uncovered PoP site is minimized, where an uncovered PoP site is outside of the LLP system 110. (Note that another possible goal would be to minimize average latency, although this may result in some uncovered POP sites that have very high latency to the LLP system 110 and, as a result, connection setup for endpoints near that uncovered POP site may incur very high latency.) In other words, for any PoP site u that is not in V, there should exist a PoP site v in V such that the latency of link (u,v) is less than D, and D is the least possible. Although this problem is NP-hard, it can be solved within a 2-approximation of D. That is, the latency achieved for set V is no more than 2D*, where D* is the lowest-latency possible for m PoP sites. For this, the following algorithm can be used:

Pick an arbitrary PoP site v from the set of all PoP sites. Add v to the subset V.
While $|V|<m$, do the following:
Pick another PoP site v that is not in V and is furthest from all PoP sites in V, i.e., has the highest latency to any PoP site in V. Add v to V.

Note that the algorithm presented above can also be used to pick a greater or lesser number m of PoP sites if the worst latency D for the selected m PoP sites in the subset V is too high or too low. Also, the algorithm can be modified to select PoP sites for a given cost budget when PoP sites at ASs have associated costs. See, e.g., Hochbaum, D. S., & Shmoys, D. B. (1986), "A unified approach to approximation algorithms for bottleneck problems," Journal of the ACM (JACM), 33(3), 533-550, the teachings of which are incorporated herein by reference in their entirety.

Algorithm for Constructing LLP Trees

The LLP servers are hosted at the PoP sites selected by the algorithm described above. The number of LLP servers hosted at a PoP site may depend on the amount of load expected at that PoP site from nearby endpoints 130 for locator registration, locator lookup, and CSR forwarding operations. In the following, the one or more LLP trees for the PoP sites are first constructed and then LLP servers are assigned to the PoP sites on the basis of the load on the PoP site from the one or more different LLP trees.

Let H be a hash function H: VIP$\rightarrow\{1 \ldots r\}$. That is, H maps the set of all VIPs into one of r different values. Only VIPs with the same hash value can be assigned to the same LLP tree. This helps balance the load across the LLP trees (and hence across the LLP servers)—the larger the value of r, the less load per LLP tree/server.

Let s be the maximum number of LLP trees for a given endpoint 130. By using multiple LLP trees per endpoint 130, the latency of the CSR operations for the endpoint 130 can be reduced. This is because a CSR operation for an endpoint 130 can be processed in parallel by all of the LLP trees for that endpoint. This ensures that the CSR gets delivered by the LLP tree that incurs the lowest latency. Thus, the higher the s, the lower the latency for processing the CSR operation can be.

Overall, the LLP servers are distributed across $k=r*s$ different LLP trees. Thus, the total serving capacity needed is directly proportional to k times the number of nodes per LLP tree.

A single LLP tree (i.e., a single instance of LLP system 110) can be constructed as follows. Start with an overlay latency graph $G=(V, E)$ of PoP sites with a set V of nodes (i.e., PoP sites) and the set E of edges (i.e., available links between PoP sites). A link (u,v) in G represents the least latency path from node u to node v. In particular, the latency $l\_\{u,v\}$ of link (u,v) in G is the latency of the least-latency path from node u to node v. LLP trees of G are constructed as follows:

$f(u) \neq f(v), \forall u, v \in V$ where $u \neq v$ We first define tree embedding of a graph G: An embedding of G into a tree T is an injective map of the set V of nodes of G to the set of leaf nodes (V') of tree T. That is, it is a function f:V→V' such that:

$$f(u) \neq f(v), \forall u,v \in V \text{ where } u \neq v$$

Here, node v of G is mapped by f to node f(v) of T.

The randomized tree metric construction algorithm of Fakcharoenphol, J., Rao, S., & Talwar, K. (2004), "A tight bound on approximating arbitrary metrics by tree metrics," Journal of Computer and System Sciences, 69(3), 485-497 ("JCSS paper"), the teachings of which are incorporated herein by reference in their entirety, is used to create a tree embedding for G. Since the algorithm is randomized, each run of the algorithm potentially provides a different tree embedding for G. The algorithm can be run k times to get k different tree embeddings TE_1, TE_2 . . . TE_k for G.

Consider a tree embedding TE_i whose set of leaf nodes 116=PoP sites in V, while the internal nodes (i.e., root node 112 and intermediate nodes 114) represent subsets of the set V.

From TE_i, an LLP tree T_i is constructed by substituting an internal node U of TE_i by a single node u of U, where (i) U is a subset of one or more POP sites v in set V and (ii) u may be thought of as a centroid of the nodes in set U, where u could be the node which has the least average latency to all nodes in U. The node u is selected based on two criteria:

Centrality: Node u is a central node of U having a small average latency to nodes in U.
  Load balancing: There is a load-balanced distribution on the number of times a node u is picked as an internal node within LLP tree T_i. In particular, PoP sites that expect more loads can have more LLP servers and hence can be picked more often.

Next, compute resources are assigned to the nodes of TE_i as follows:

Note that the nodes of T_i are PoP sites from the set V. Also, note that a PoP site u of V may appear on multiple nodes of the tree T_i. In other words, the same POP site u may appear multiple times in the tree structure, but only once in the leaves of each T_i A unit compute resource is assigned to each PoP site u for every node of T_i in which u appears. In other words, if PoP site u appears on x nodes of T_i, then x units of computing resources are assigned for tree T_i.

The above procedure is repeated k times, each time with a different random choice of seed for the tree-embedding algorithm, to construct the k different LLP trees T_1, T_2 . . . T_k and to assign the requisite compute capacity for them at the PoP sites.

From the JCSS paper, it is known that the expected latency blowup of the tree metrics TE_i found by the randomized algorithm is within a factor of O(log|V|). That is, the expected latency for any two PoP sites u and v in V, for the random tree embeddings found by the algorithm, is no more than O(log|V|I_{u,v}), where I_{u,v} is the latency between PoP sites u and v. The same latency blowup bounds hold for the expected latency for the randomized LLP trees constructed by the above algorithm if the average over all possible LLP trees is computed. This suggests that, if a smaller set of k LLP trees is used, then the expected latency blowup with the above algorithm can be higher. In practice, however, a smaller set of k LLP trees can suffice to keep the latency blowup small because, as described earlier, CSRs for an endpoint 130 are processed in parallel by all the s LLP trees for the endpoint 130. Through this processing, the latency incurred for the CSR is the minimum of the latency incurred in any of the s trees, which is therefore likely to be lower than the expected latency through a random LLP tree.

Note that this ensures that the latency of the LLP tree path {u,w,v} from leaf node u up to LCA node w and down to leaf node v is close to the latency I_{u,v}.

The LLP trees found by the above algorithm are assigned to different endpoints 130 as follows (utilizing the hash function H defined earlier):

Trees T_1, T_2, . . . , T_s store registration information for all endpoints 130 whose VIP hashes to number 1 (i.e., endpoints for which H(VIP)=1)
  Trees T_{s+1}, . . . , T_{2s} store registration information for all endpoints 130 whose VIP hashes to number 2 (i.e., endpoints for which H(VIP)=2)
  And so on . . .
  Trees T_{rs−s+1}, . . . , T_{rs} store registration information for all endpoints 130 whose VIP hashes to number r (i.e., endpoints for which H(VIP)=r)

The locator lookup and CSRs for an endpoint 130, for which H(VIP)=i, is simultaneously performed on the trees T_{is−s+1}, . . . , T_{is}. Note that, for a given access network 120 of an endpoint 130, the locator information about the endpoint 130 (i.e., VIP-to-PIP mapping) is maintained at the same leaf node 116 on all of the LLP trees for the endpoint 130. This is the closest leaf node 116 to the endpoint 130 on that access network 120. This ensures that the different copies of the CSR (one for each of the endpoint's LLP trees) get forwarded to the same leaf node 116, which is close to the endpoint 130 on the given access network 120. This leaf node 116 forwards only the first copy of the CSR that it receives for the endpoint 130 and drops the rest of the copies, if any. This can be implemented by keeping state information at the leaf nodes 116 about the CSRs that are already forwarded to the endpoint 130. This mechanism ensures that a) the CSR is forwarded to the endpoint 130 with the minimum latency possible among all of the endpoint's LLP trees and b) the endpoint 130 does not receive multiple copies of the CSR.

Design Details

Each LLP tree (i.e., each instance of LLP system 110) includes a root node 112, a set of intermediate nodes 114, and a collection of leaf nodes 116. The leaf nodes 116 of an LLP tree are contacting points for endpoints 130 and maintain endpoints' "last-mile" access information (i.e., VIP-to-PIP mappings). Specifically, this information is maintained only by leaf nodes 116 of an LLP tree at the first hop to the endpoint 130 for a given access network 120. The intermediate nodes 114 on the paths from these leaf nodes 116 to the root node 112 of the LLP tree store a pointer entry indicating which of their child nodes should be used to consult for the endpoint's VIP address. Depending on where the intermediate node 114 is in the tree structure, a child node is either another intermediate node 114 in the next lower layer or the leaf node 116 itself.

The following describes how an LLP tree operates in the context of a single endpoint 130.

The LLP servers follow a hierarchical architecture (LLP tree) with one root node 112, a series of intermediate nodes 114, and a number of leaf nodes 116.
  For a given endpoint 130 having a specific VIP address, the root node 112 and one or more associated intermediate nodes 114 each store a pointer entry indicating which one or more of its child nodes should be used to consult for that VIP address.

Each associated leaf node 116 stores an appropriate VIP-to-PIP mapping and is responsible for tracking the endpoint's access network 120 during the mapping's lifetime.

Data Structures

The LLP system maintains several data structures to support its functions. These data structures are defined as follows:

VIP mapping table: The VIP mapping table aims to direct the query to the next level LLP server or the destination endpoint 130. All the LLP servers maintain this kind of table. However, the intermediate nodes 114 and the root node 112 maintain only which one of its child nodes contains the entry of a specific access network 120 for a given endpoint 130. On the other hand, a leaf node 116 maintains the entry from the VIP's specific access network 120 to the endpoint's PIP. VIP mapping tables have the VIP/nID as their entry key, but the entry value can be different, depending on whether the LLP server is a leaf node 116 or a root/intermediate node 112/114. The entries in VIP mapping tables are called "interface records".

Access count table: When accessing an endpoint 130, all of its registered access networks 120 are accessed. The count of accessible access networks 120 is recorded in an access count table. Specifically, the entries have VIP as keys and the number of access networks 120 as value. An LLP server that maintains a VIP mapping for a specific VIP should also have the access count entry for that VIP.

Connection setup requests (CRS) pool: When a connection setup happens simultaneously with endpoint migration, the CSR may get dropped during delivery since it may get forwarded by the LLP system 110 to a location where the endpoint 130 is no longer present. This can happen because the LLP tree interface records might not have been updated with the endpoint's new location in the LLP system 110 when the CSR is processed. To prevent such losses, the CSRs for an endpoint 130 are kept at an LLP server of the LLP system 110 for a certain amount of time. Following a link update, any CSRs in the pool are forwarded by their LLP server to the new location where the endpoint 130 is connected to the corresponding access network 120.

Figure 2:
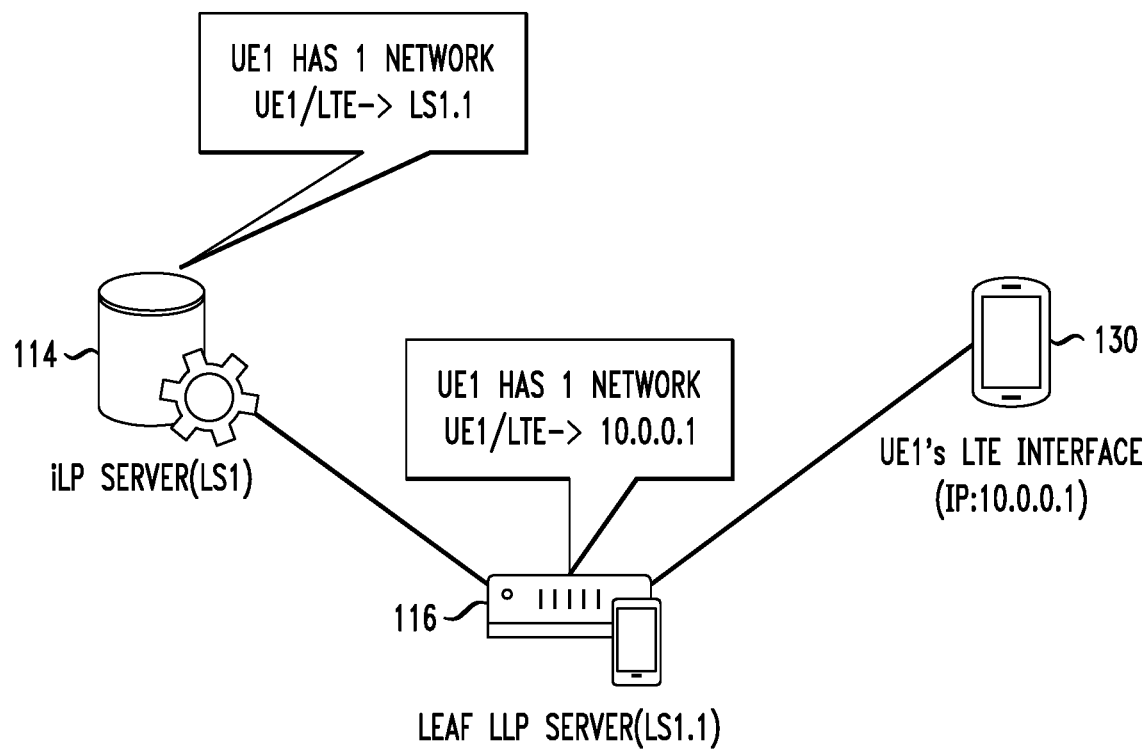
FIG. 2 is a diagram showing an endpoint of the LLP system of FIG. 1, an associated leaf node that communicates with that endpoint via a particular LTE network, and an associated intermediate node.

FIG. 2 is a diagram showing an endpoint 130 of LLP system 110 of FIG. 1, an associated leaf node 116 that communicates with that endpoint 130 via a particular LTE network, and an associated intermediate node 114. As represented in FIG. 2, the intermediate node 114 has an entry that points to leaf node 116 as the intermediate node's child node that next processes a request to the endpoint 130. Leaf node 116 has an entry that includes the endpoint's current PIP (i.e., an IPv4 address just for illustration purpose). Note that each LLP server (i.e., intermediate node 114 and leaf node 116) has a counting entry, which indicates the total number of available interfaces of endpoint 130 (in this case, one).

Service Discovery and Registration

The service discovery and registration are the starting point where the endpoints 130 are accepted and served by the LLP system 110. The following describes one possible approach based on DNS and another possible approach based on anycast.

DNS-Based Approach

FIG. 3 is a signal flow diagram representing a DNS-based approach for service discovery and registration for an endpoint (i.e., UE) 130 of LLP system 110 and a corresponding node 302. In this implementation of service discovery and registration, the DNS system can support policies such as selecting nearer leaf nodes 116, load balancing among leaf nodes 116, etc.

As represented in FIG. 3, when the endpoint 130 comes online (step 310), the endpoint 130 queries (step 312) a DNS server 306 for information about the LLP system 110, where the query includes the endpoint's VIP address, and the DNS server 306 provides (step 314) that information to the endpoint 130. The information includes a Reverse DNS (RDNS) record which has the IP address of the LLP system 110. In step 316, for each access network 120, the endpoint 130 registers its VIP-to-PIP mapping with the corresponding leaf node 116 in the LLP system 110.

When the corresponding node 302 is ready to communicate with the endpoint 130 (step 318), the corresponding node 302 sends (step 320) an LLP lookup query to a DNS server 304 (which may be the same as or different from the DNS server 306) for the endpoint 130, where the query includes the endpoint's VIP address. In response, in step 322, the DNS server 304 sends, to the corresponding node 302, an RDNS record having the IP address of leaf node 116 that is near the endpoint 130.

In step 324, the corresponding node 302 transmits, to the LLP system 110, a CSR identifying the VIP address of the endpoint 130. In some embodiments, in step 326, the LLP system 110 responds with a list of the one or more PIP addresses currently associated with the endpoint 130. This allows the corresponding node 302 to bypass the LLP system 110 for any subsequent CSRs to the endpoint 130 within a short time interval.

In step 328, for each access network 120, the LLP system 110 transmits a copy of the CSR to the endpoint 130. In response to the first received CSR, the endpoint 130 sends (step 330) a reply to the corresponding node 302. Note that that reply might or might not be transmitted via the LLP system 110. At that point, the corresponding node 302 and the endpoint 130 are able to send (step 332) messages back and forth again either via the LLP system 110 or not.

BGP Anycast-Based Approach

FIG. 4 is a signal flow diagram representing a BGP anycast-based approach for service discovery and registration for an endpoint (i.e., UE) 130 of LLP system 110 and a corresponding node 402. In this approach, each leaf node 116 advertises one or more VIP prefixes that belong to the LLP service provider. Such route advertisement can reach other routers in network through IGP (Interior Gateway Protocols) and/or BGP. As the result, each router will forward the packet destinated to such VIPs to the LLP server that is the closest to this router. Both the corresponding node 402 and the UE endpoint 130 of FIG. 4 set VIP as destination when they need to reach LLP-C leaf node 116(C) or LLP-S leaf node 116(E). Note that although the endpoint 130 is identified by VIP, packets destinated to VIP are handled by the LLP system 110; only packets destinated to its PIPs are delivered to the endpoint 130.

As represented in FIG. 4, when the endpoint 130 comes online (step 410), for each available access network 120, the endpoint 130 registers (step 412) its VIP-PIP mapping with a corresponding leaf node 116(E) associated with the endpoint 130 by sending a packet with destination address set as VIP. Specifically, for each access network 120 to be used by the endpoint 130 to join the LLP system 110, the endpoint 130 sends a joining (locator/access registration) message through that access network 120 to VIP. The source address of this packet is the PIP of the endpoint 130 on the access network 120. The destination address is the VIP of the endpoint 130. Since the routers in the network know leaf node 116(E) can reach VIP with the minimum hop count, the nearest leaf node 116(E) on that access network 120 will receive the joining message. Each joining message also contains the number of access networks 120 to be used by the endpoint 130 with the LLP system 110.

When the corresponding node 402 is ready to communicate with the endpoint 130 (step 414), the corresponding node 402 sends the CSR packet directly to VIP (step 416). This message is then routed to a nearby leaf node 116(C) in the LLP system 110 (which might or might not be different from the one or more leaf nodes 116(E) associated with the endpoint 130). Similar to the DNS-based approach, in some embodiments, in step 418, the LLP system 110 responds with a list of the one or more PIP addresses currently associated with the endpoint 130 that allows the corresponding node 402 to bypass the LLP system 110 for any subsequent CSRs to the endpoint 130 within a short time interval.

Assuming that the leaf node 116(C) is different from the one or more associated leaf nodes 116(E), in step 420, the nearby leaf node 116(C) forwards the CSR to each associated leaf node 116(E) through the LLP system 110. In step 422, for each access network 120, the one or more associated leaf nodes 116(E) transmit a copy of the CSR to the endpoint 130 using the corresponding PIP as destination. In response to the first received CSR, the endpoint 130 sends (step 424) a reply to the corresponding node 402. Note that that reply might or might not be transmitted via the LLP system 110. At that point, the corresponding node 402 and the endpoint 130 are able to send (step 426) messages back and forth again either via the LLP system 110 or not.

When the endpoint 130 moves to another region, other leaf nodes 116 should serve its connection. For this, the endpoint 130 may send update messages using its VIP as destination, to update the LLP system 110 for each access network 120 that is impacted by the move. Through anycast routing, these messages get routed to the appropriate leaf nodes 116.

Details

Figure 5:
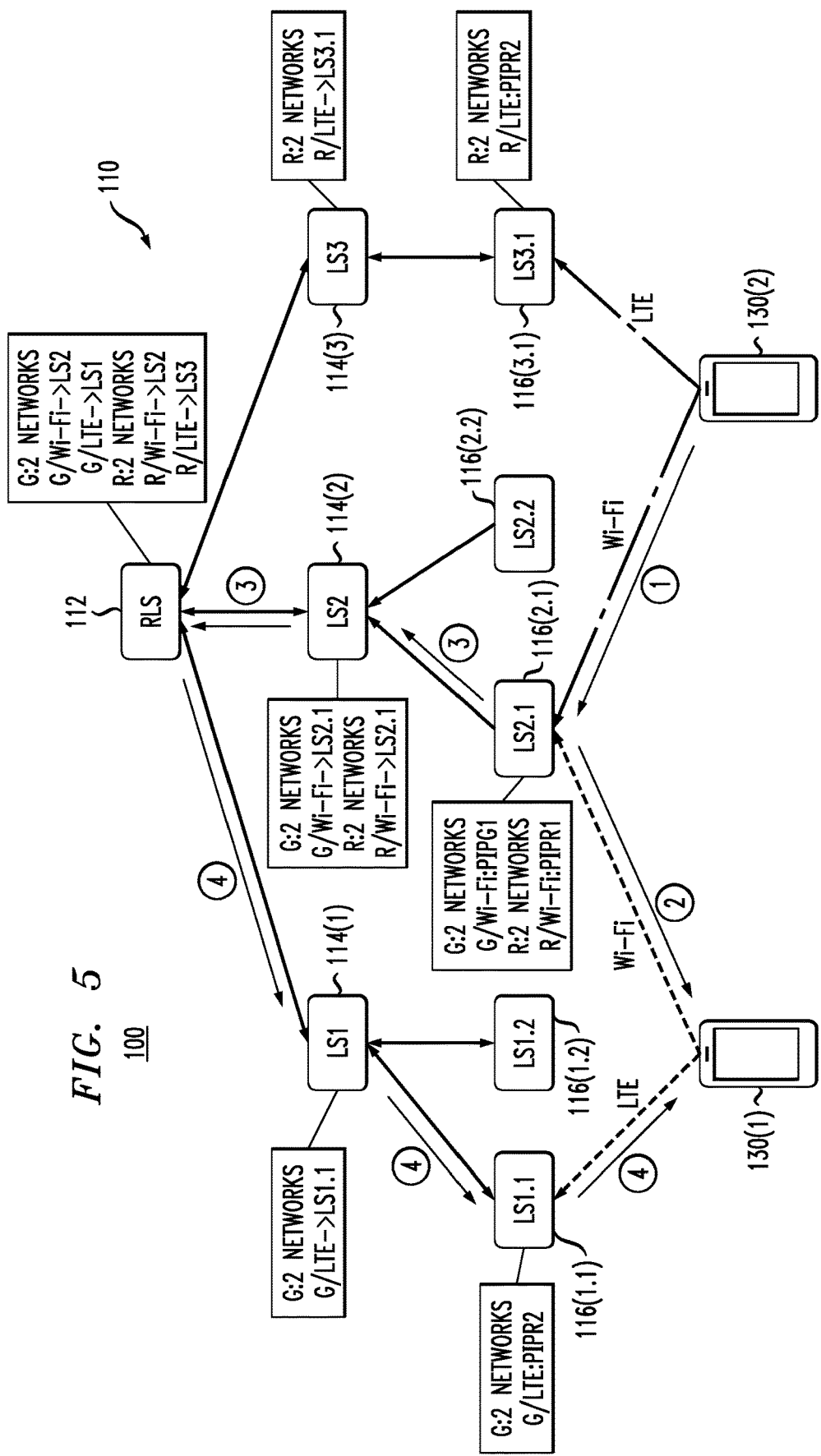
FIG. 5 is a diagram illustrating the connection setup process through the LLP system of FIG. 1.

FIG. 5 is a diagram illustrating the connection setup process through the LLP system 110 of FIG. 1 for endpoints 130(1) and 130(2). FIG. 5 shows root node 112, intermediate nodes 114(1)-114(3), and leaf nodes 116(1.1)-116(3.1), where:

Intermediate nodes 114(1)-114(3) are the child nodes of root node 112;
Leaf nodes 116(1.1) and 116(1.2) are the child nodes of intermediate node 114(1);
Leaf nodes 116(2.1) and 116(2.2) are the child nodes of intermediate node 114(2);
Leaf node 116(3.1) is the child node of intermediate node 114(3);
Leaf node 116(1.1) is capable to communicating with endpoint 130(1) via LTE access network 120(1.1);
Leaf node 116(2.1) is capable to communicating with both endpoint 130(1) and endpoint 130(2) via WiFi access network 120(2.1); and
Leaf node 116(3.1) is capable to communicating with endpoint 130(2) via LTE access network 120(3.1), which may be the same as or different from LTE access network 120(1.1).

FIG. 5 shows the interface records stored in the LLP servers of the LLP system 110 from the registration of access networks 120 and the associated PIPs for the VIPs of the endpoints 130(1) and 130(2), where, in FIG. 5, "G" corresponds with endpoint 130(1) and "R" corresponds with endpoint 130(2).

For example, endpoint 130(1)'s locator registration for the LTE access network 120(1.1) updates the interface records of LLP servers in the LLP system 110 on the path to the root node 112 starting at leaf node 116(1.1). In particular, the VIP-to-PIP mapping for endpoint 130(1) for the LTE access network 120(1.1) is kept at leaf node 116(1.1), while a downwards pointer to child leaf node 116(1.1) is kept at intermediate node 114(1) and a downwards pointer to child intermediate node 114(1) is kept at root node 112.

Similarly, endpoint 130(1)'s locator registration for the WiFi access network 120(2.1) updates the interface records of LLP servers in the LLP system 110 on the path to the root node 112 starting at leaf node 116(2.1). In particular, the VIP-to-PIP mapping for endpoint 130(1) for the WiFi access network 120(2.1) is kept at leaf node 116(2.1), while a downwards pointer to child leaf node 116(2.1) is kept at intermediate node 114(2) and a downwards pointer to child intermediate node 114(2) is kept at root node 112.

Furthermore, endpoint 130(2)'s locator registration for the WiFi access network 120(2.1) updates the interface records of LLP servers in the LLP system 110 on the path to the root node 112 starting at leaf node 116(2.1). In particular, the VIP-to-PIP mapping for endpoint 130(2) for the WiFi access network 120(2.1) is kept at leaf node 116(2.1), while a downwards pointer to child leaf node 116(2.1) is kept at intermediate node 114(2) and a downwards pointer to child intermediate node 114(2) is kept at root node 112.

Lastly, endpoint 130(2)'s locator registration for the LTE access network 120(3.1) updates the interface records of LLP servers in the LLP system 110 on the path to the root node 112 starting at leaf node 116(3.1). In particular, the VIP-to-PIP mapping for endpoint 130(2) for the LTE access network 120(3.1) is kept at leaf node 116(3.1), while a downwards pointer to child leaf node 116(3.1) is kept at intermediate node 114(3) and a downwards pointer to child intermediate node 114(3) is kept at root node 112.

As shown in FIG. 5, the LLP servers also store the number of access networks 120 for each corresponding endpoint 130 in their interface records. Each endpoint 130 includes this information in the service discovery/registration joining/update messages it sends to the LLP system 110.

Connection Setup Details

The LLP system 110 is responsible for processing and forwarding the connection setup request (CSR) received from a corresponding node to an endpoint 130 that is registered with the LLP system 110. For this, the LLP system 110 needs to keep the one or more current locators (PIP addresses) of the endpoint 130, which need to be accessed using the endpoint's identifier (VIP). The LLP system 110 needs to forward the CSR to the endpoint 130 on its one or more PIP addresses corresponding to one or more different access networks 120, which can require replication of the CSR. The LLP system 110 may also send back to the corresponding node, the endpoint's locators to allow bypassing the LLP system 110 for any subsequent CSRs to the same VIP within a short time interval.

The following description assumes that (i) endpoints 130(1) and 130(2) are both associated with the LLP system 110 and therefore both have VIP addresses, (ii) endpoint 130(2) is a corresponding node that wants to connect to endpoint 130(1), (iii) both endpoints 130(1) and 130(2) are mobile UEs, such that their physical IP addresses can be ephemeral, and (iv) each endpoint 130 has no prior knowledge about the physical IP address of the other endpoint 130.

During connection setup, either endpoint 130 could experience a migration, so some of their access network interfaces might not be accessible. Therefore, the LLP system 110 will do a best-effort connection setup, where the LLP system 110 tries to deliver the CSR from the source endpoint 130(2) to every access network 120 of the destination endpoint 130(1).

Besides the VIPs of the destination endpoint 130(1) and the source endpoint 130(2), the CSR also includes the one or more PIP addresses of the source endpoint 130(2). This allows the destination endpoint 130(1) to directly respond to the CSR without going through the LLP system 110. The SRv6-based CSR messages are described later.

The source endpoint 130(2) wants to communicate with the destination endpoint 130(1), but the source endpoint 130(2) knows only the VIP address of the destination endpoint 130(1) and not any current PIP of the destination endpoint 130(1). Through the DNS-based service discovery and registration process of steps 318-322 of FIG. 3, the source endpoint 130(2) determines that it can connect to the LLP system 110 via WiFi access network 120(2.1) to leaf node 116(2.1) and via LTE access network 120(3.1) to leaf node 116(3.1). In this example scenario, the source endpoint 130(2) decides to use the WiFi access network 120(3.1) to try to reach the destination endpoint 130(1). On the other hand, if the source endpoint 130(2) uses the BGP anycast-based service discovery and registration process of steps 414-418 of FIG. 4, then the source endpoint 130(2) would not need to determine how it is connected to the LLP system 110.

As such, in Step 1 of FIG. 5, the source endpoint 130(2) transmits a CSR to leaf node 116(2.1) via the WiFi access network 120(2.1). In this example scenario, the CSR is an SRv6 packet, whose last segment is the destination endpoint 130(1)'s VIP address.

In Step 2 of FIG. 5, leaf node 116(2.1) receives the CSR from source endpoint 130(2), determines that the last-segment address in the CSR is a VIP address, and recognizes that it has the current PIP address corresponding to that VIP address for the Wi-Fi access network 120(2.1). In that case, leaf node 116(2.1) will set that PIP address as the destination IP address and forward the CSR to the destination endpoint 130(1)'s Wi-Fi interface.

The interface record associated with the destination endpoint 130(1) stored in leaf node 116(2.1) indicates that the destination endpoint 130(1) is associated with two access networks 120, but leaf node 116(2.1) has knowledge of only the WiFi access network 120(2.1). As such, in Step 3 of FIG. 5, leaf node 116(2.1) passes a copy of the CSR up to its "parent" LLP server (i.e., intermediate node 114(2)), which recognizes that it too has information about only one access network for the destination endpoint 130(1) and therefore passes a copy of the CSR up to is patent LLP server (i.e., root node 112).

The root node 112 checks its records and determines that the destination endpoint 130(1) has registered two access networks and that the root node 112 has both interface records for the destination endpoint 130(1). The root node 112 has pointers to two different child nodes associated with the destination endpoint 130(1): intermediate node 114(1) and intermediate node 114(2). In theory, the root node 112 could send one copy of the CSR to intermediate node 114(1) to eventually reach the destination endpoint 130(1) via LTE access network 120(1.1) and another CSR copy to intermediate node 114(2) to eventually reach the destination endpoint 130(1) via WiFi access network 120(2.1). However, since the root node 112 received the CSR from its child (i.e., intermediate node 114(2) on the locator registration path for the destination endpoint 130(1)'s Wi-Fi access network 120(2.1), the root node 112 knows that it does not need to forward the CSR to that child.

The other registration in the root node's interface record is for the destination endpoint 130(1)'s LTE access network 120(1.1). As such, in Step 4 of FIG. 5, the root node 112 uses the corresponding downward pointer in its interface record for the destination endpoint 130(1)'s LTE access network 120(1.1) to pass the CSR to intermediate node 114(1), which in turn uses the downward pointer in its interface record for the destination endpoint 130(1) to pass the CSR to leaf node 116(1.1), which in turn uses the VIP-to-PIP mapping in its interface record for the destination endpoint 130(1) to send the CSR to the destination endpoint 130(1) using the destination endpoint's current PIP address associated with the LTR access network 120(1.1). In some embodiments, each leaf node 116 (i.e., leaf nodes 116(1.1) and 116(2.1)) caches the CSR in its connection pool for a short time.

Through this process, the destination endpoint 130(1) could receive the CSR from each different access network 120. Although the leaf nodes 116 eliminate any duplicate CSRs, the destination endpoint 130(1) also performs a duplication elimination process to accept only one copy of each CSR.

In some embodiments, the source endpoint 130(2) attaches all of its available access network interfaces in the type length vector (TLV) field of the CSR SRv6 packet. In this way, the CSR conveys to the destination endpoint 130(1) all of the access networks 120 (and their PIP addresses) of the source endpoint 130(2).

In some embodiments, when replying to the CSR, the destination endpoint 130(1) conveys all of its available interface network interfaces (and their PIP addresses) in the TLV fields of the reply message to the source endpoint 130(2).

Endpoint Migration

Migration is a common procedure in the mobile access networks 120. During migration, an endpoint 130 will lose connection with one or more access networks 120 and reconnect the lost access network(s) 120 to another access point. After the migration, the new connection access point may allocate the endpoint 130 with a new physical IP. Therefore, to make seamless connection migration after the migration of the access network 120, the LLP system 110 is updated accordingly. During special cases where a CSR is handled by the LLP system 110 when an endpoint migration is in progress, there could be a race condition causing the connection setup not to reach the migrated access network 120.

Migration Update

Generally, the migration update is triggered by the service discovery after the endpoint 130 reconnects to one of the leaf nodes 116 after the endpoint 130 arrives in a new region. Since the new leaf node 116 is always different from the last leaf node 116, the previous interface records in the LLP system 110 are eliminated. The new leaf node 116 updates its locator table, adding a VIP/nID key with the endpoint 130's new PIP address as its value. During the reconnection, the new leaf node 116 could also obtain the number (nID) of access networks 120 through the service discovery, where the endpoint 130 could send the nID to the new leaf node 116. Furthermore, the new leaf nodes 116 drafts an updating message to its parent intermediate node 114, which updates accordingly. The updating message propagates upward towards an LLP server, where the migrated access network 120 was previously registered.

Upon receiving this update message, the first LLP server on this upwards path that has the previous interface record for the endpoint 130 for this access network updates its interface record with the new information. Then, instead of sending the message up, that LLP server sends the updating message downward through the path where the interface record was previously recorded. The updating message sent downward deletes the outdated records along the path to the leaf node 116 that previously served the interface record mapping from VIP/nID to PIP. If this update message for deleting outdated records reaches a leaf node 116 that maintains a CSR for the endpoint 130 in its connection pool, then that leaf node 116 will try to resend that CSR to the endpoint 130. In particular, the leaf node 116 will propagate the CSR up the tree from where the CSR will get forwarded to the endpoint 130 following the last update received from the endpoint 130 and recorded in the LLP system 110. After re-sending the CSR, the leaf node 116 will clear that CSR from its connection pool.

Figure 6:
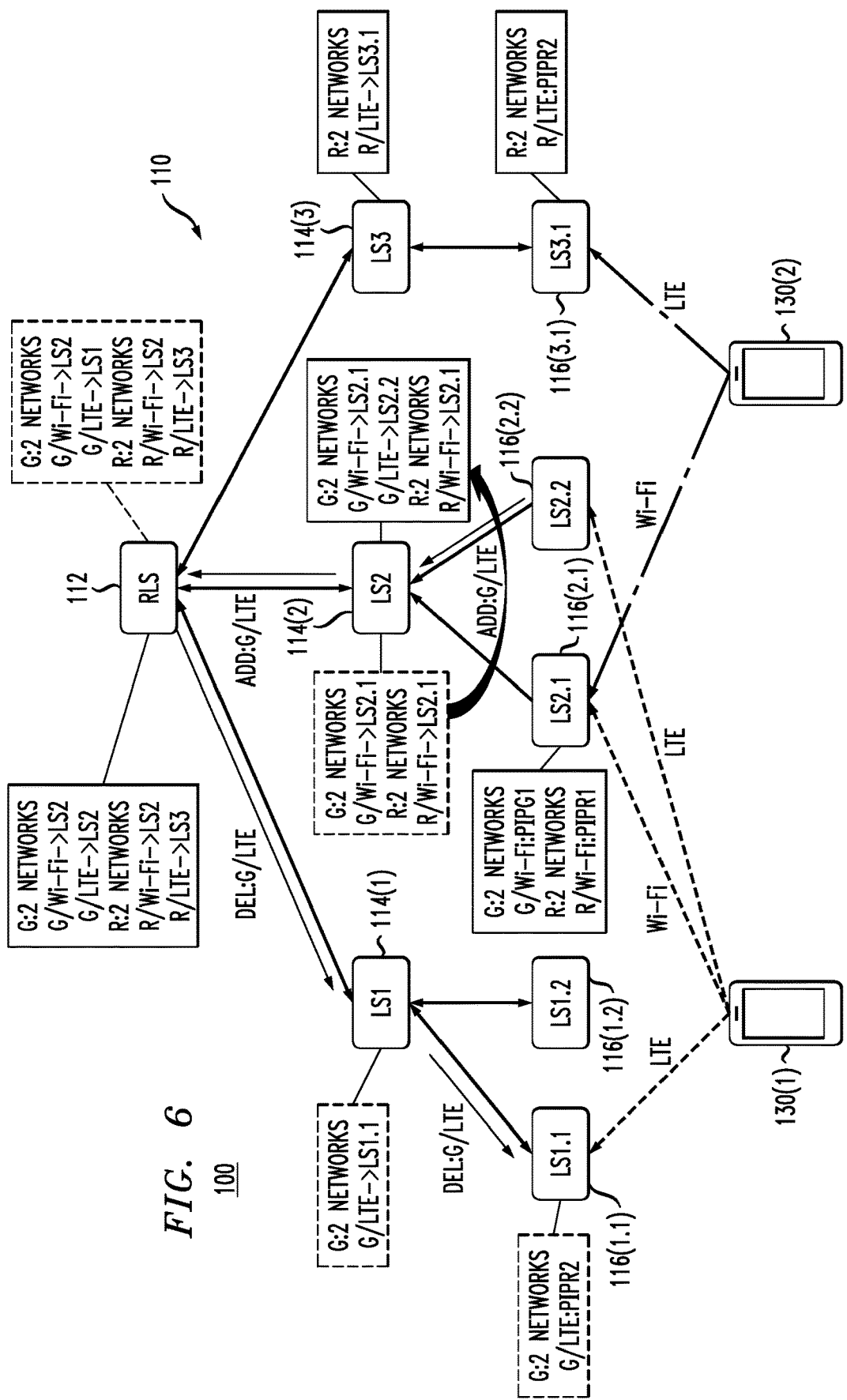
FIG. 6 is a diagram representing an example of endpoint migration.

FIG. 6 is a diagram representing an example of endpoint migration. In this example, the endpoint 130(1) was originally connected through the LTE access network 120(1.1) to leaf node 116(1.1), but the LTE connection later migrates to leaf node 116(2.2). Expired tables due to migration are shown in FIG. 4 in dashed boxes, and updated tables are shown in solid boxes. After the endpoint 130(1) discovers the new leaf node 116(2.2) for its LTE connection, the new leaf node 116(2.2) sends the link update upward to its parent node (i.e., the intermediate node 114(2), which is the first LLP server to receive the addition of endpoint 130(1)'s LTE link. The intermediate node 114(2) adds an entry for G/LTE, with the entry value pointing to leaf node 116(2.2), and forwards the link update to the root node 112, which detects a change of G/LTE location: G/LTE moves from intermediate node 114(1) to intermediate node 114(2). Since the link update comes from the adding path, the root node 112 will send a deleting message following the previous path from the root node 112 to the leaf node 116(1.1) (after updating its G/LTE entry to point to the intermediate node 114(2)). Thus, the LLP servers on the previous path will delete corresponding entries.

There can be a race condition of migration updates when the endpoint 130 migrates on an access network more than once in a very short time. In such a race condition within the LLP system 110, the older update may get processed after the newer update, which may make the LLP entries inaccurate. This problem is addressed by having the endpoint 130 include a non-decreasing version number of its updates. Older updates can be identified using these version numbers and discarded in favor of the newer ones. This can ensure that the newer updates do not get over-ridden by the older updates due to such race conditions.

Connection Setup Under Migration
Connection Pool

The migration update process involves updating the tables in multiple LLP servers, which could result in race conditions when a connection setup is in progress. As described above, LLP servers maintain a pool of recently sent CSRs for a certain time to prevent this problem. A leaf node 116 will cache a CSR with all the VIP mapping entries for the VIP address. Leaf nodes 116 can tell that they have enough entries by comparing their number against the access count table value.

When the leaf node 116 that caches a CSR receives a migration update, or when the leaf node 116 receives a message for deleting updated records, the leaf node 116 updates its interface table entries accordingly. The leaf node 116 then forwards the CSR along the new path (by forwarding the CSR up the tree) to the migrated link of the endpoint 130 to ensure that the endpoint 130 receives a copy of the CSR on the migrated link. As shown in FIG. 6, before the migration of endpoint 130(1)'s LTE link, leaf node 116(1.1) caches the CSR designated to endpoint 130(1). When the migration update completes, leaf node 116(2.2) will cache the connection setup request.

Special Considerations
Private Network

As described earlier, in some embodiments, the corresponding node includes its current PIP address(es) in the SRv6 header/segment of the CSR. This can allow the destination endpoint 130 to directly respond to the corresponding node without first having to do a locator lookup to resolve the PIP addresses of the corresponding node based on its VIP (if any). However, in some cases (e.g., for enterprises), the corresponding node's physical IP addresses can be private and non-routable. In this case, SRv6 gateways on the endpoint's access network(s) 120 serve as an intermediate hop for segment routing to do the translation between private and public physical addresses—they insert segments in outgoing packets containing their own public IPs and forward to endpoints 130 their incoming packets based on the VIPs contained in the segment headers. Since an SRv6 gateway can serve only its own access network, the corresponding node may need to send one CSR per private network for appropriate address translation of its PIP for that access network. This can be incorporated into the design for the LLP system 110. For simplicity, the present disclosure has focused only on the case that the endpoint physical addresses are public/routable; hence, the intermediate translation at SRv6 gateways is not required.

Protocols and Endpoint Implementation

The following describes an endpoint-based implementation of the LLP system 110 for low-latency connection setup and mobility, including access mobility with SRv6 and eBPF.

Endpoint Service Discovery and Registration

When an endpoint 130 joins the LLP system 110, the endpoint 130 should discover its closest leaf node 116 for each of its access networks and let the closest leaf node 116 know its accessible physical address. A network monitor module on the endpoint 130 could initiate this discovery and registration by sending a message towards the LLP system 110. This message is first intercepted by an eBPF module on the endpoint 130 that adds information about the local interfaces (e.g., physical IP addresses) before sending the message out to the LLP system 110. The following description is regarding FIG. 4, which assumes an anycast-based discovery of a leaf node 116.

When a new endpoint 130 joins the LLP system 110, the endpoint 130 sends a service discovery message with source address as the PIP address it wants to register and destination address as its VIP. The endpoint's eBPF module intercept the message and inserts all available physical addresses as TLV fields into the SRv6 header of the packet. Such VIP address is shared by all the leaf nodes 116 of a given LLP service provider. Thus, the closest leaf nodes 116 will receive this service discovery message due to anycast routing. The closest leaf node 116 reads the PIP address in the source address field, resolves and records the address it could access, and records the total number of the endpoint's physical networks. This message updates (record this endpoint 130 registration) the paths from this leaf node 116 to all the root nodes 112 of all the LLP systems 110 for the endpoint 130. Note that the endpoint 130 may send multiple registration messages, one per access network 120. Each of these messages may be sent out from the access network for which the registration is being sent. This ensures handling of Network Address Translation (NAT) on private networks as was described before.

Initial Connection Setup

The CSR SRv6 packet can be constructed in the source endpoint's operating system (OS). Specifically, the application's initial CSR, which has destination address as VIP of the destination endpoint, can be intercepted by the OS kernel using eBPF. The eBPF module does the following upon intercepting this packet assuming an anycast-based discovery of the leaf node 116. The eBPF module adds an SRv6 segment to the packet's map data structure, which contains the PIP address of the interface the source endpoint 130 uses for sending out the packet. This packet also includes the PIP addresses of all of the source endpoint's access networks 120 into the TLV field for the destination endpoint to use in replying. The eBPF module in the endpoint 130 forwards the packet to the destination endpoint's VIP address via the leaf node 116 associated with the corresponding node. The LLP system 110 will replicate the CSR packet and make the best effort to deliver the CSR to all of the destination interfaces.

Network and Locator Updates for Ongoing Connections

The previous sections introduce the method of setting up initial connections (through CSRs) between the two mobile endpoints 130. After the destination endpoint 130 receives the initial CSR, it can reply directly to the source endpoint 130 using SRv6, which contains three segments: the PIP address of the destination endpoint 130, the PIP address(es) of the source endpoint 130 (which are included in the initial CSR), and the source endpoint's VIP address. Similarly, when the source endpoint 130 receives this reply, it sends the following packets using SRv6 with three segments: the PIP address of the source endpoint 130, the PIP address(es) of the destination endpoint 130, and the destination endpoint's VIP address.

However, the PIP address involved in the setup phase might not be optimal in terms of costs, latency, and bandwidth. Thus, the two endpoints 130 could negotiate their connecting locators by sharing their locator lists with each other. As previously mentioned, the CSR contains two extra segments, with the first segment being the source endpoint's PIP address. Therefore, the destination endpoint 130 acknowledges the PIP address of the source endpoint, which can be used for exchanging the locator information.

In some embodiments, after the destination endpoint 130 receives the CSR, it responds with a UDP packet, which carries the destination endpoint's PIP address(es) to the source endpoint 130. The source endpoint 130 can also send its PIP address(es) through this packet format. As described earlier, for private sender locators, this packet may need to be sent through each of the senders' private networks SRv6 gateway for network address translation.

Figure 7:
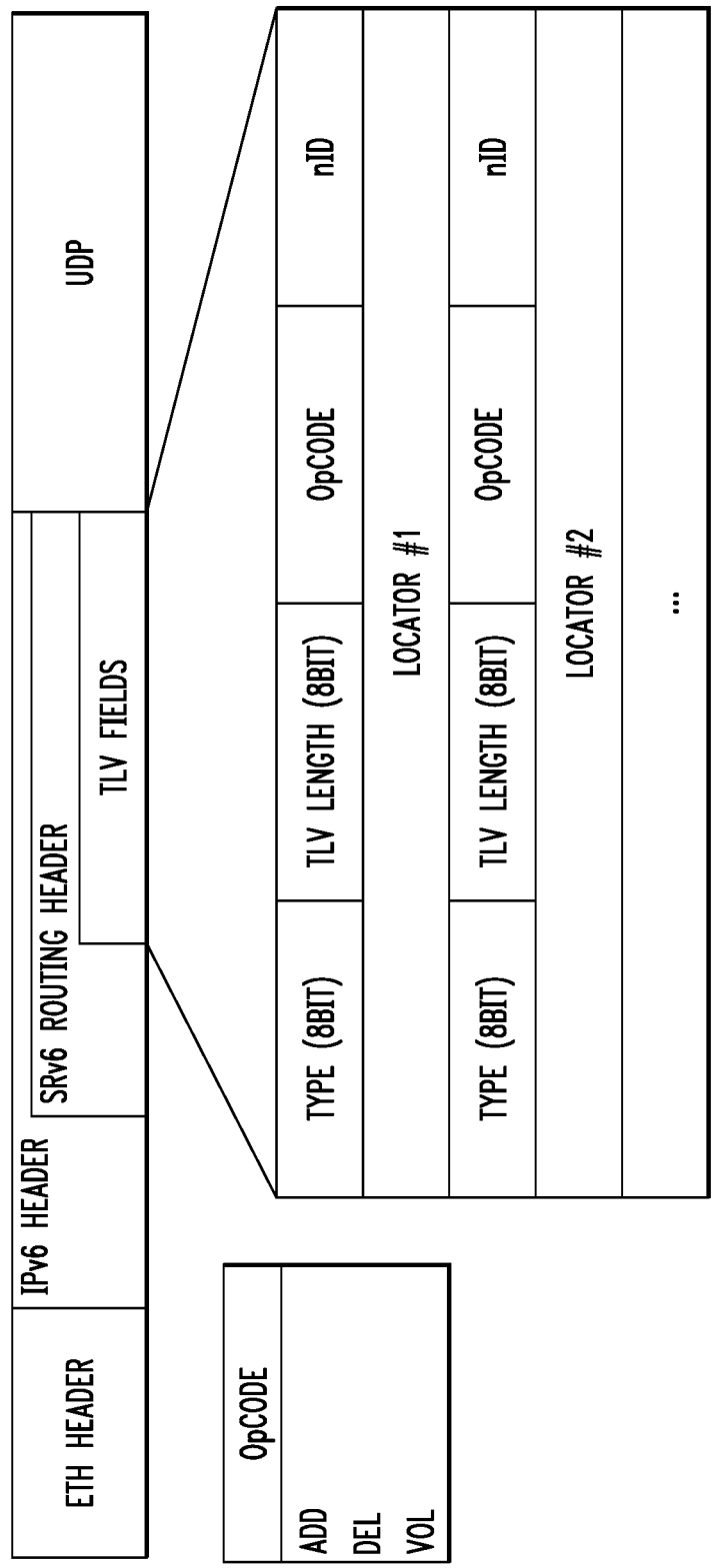
FIG. 7 is a diagram representing the format of a UDP packet according to certain embodiments of the disclosure.

FIG. 7 is a diagram representing the format of a UDP packet according to certain embodiments of the disclosure, where the Opcode=VOL, indicating that the locators are changed by volume. The SRv6 Routing header aligns with the ordinary data packets between the two endpoints 130, which should be (endpoint VIP and endpoint PIP). By sharing the locator information of the two endpoints, as well as placing the PIP with the source endpoint's preference order, each endpoint 130 can acknowledge the other endpoint's locator preference and adjust their sending policy accordingly.

Dynamic, Fast Disruption-Free Switching of Networks for Active Connections

This section describes peer-to-peer updates (directly between two endpoints 130) of locators for ongoing connections. Updating the remote endpoint 130 with any changes in networks/locators (e.g., when a network connection is lost or when connected to a new network, or when a different network is to be used for a connection) in a timely manner is for maintaining the connection under mobility. To support the updating and notifying, in some embodiments, an endpoint 130 employs a user-space monitor to surveil the network/link connection status and control the eBPF forwarding rules that steer the SRv6 traffic.

The monitor detects link drop/add through NetLink messages. Furthermore, the monitors can also insert telemetry messages by controlling the eBPF program to measure network latency and/or throughput to guide precise switching between network connections. When the monitor detects a local link drop or tries to avoid using a local link for a connection. The monitor instructs the local eBPF program to switch to using the preferred egress locator. The monitor sends a link notification using the format shown in FIG. 7, with the opcode to be DEL. This notification may be broadcast to the other side through each of the sender's other links that are currently up.

The remote eBPF program receives the link notification packets and changes the local ingress and egress rule to use the next preferred locator of the sending side. When the monitor detects a local link, add or try to switch the preferred receiving locator. The monitor adds an ingress rule in the eBPF program to accept remote connections through this locator; if the added locator is preferred to be a sending locator, also add an egress rule for using this locator. If the local endpoint 130 tries to use a new locator as a preferred receiving locator, then the monitor sends a link notification packet using the format shown in FIG. 7, with the opcode to be ADD.

The remote eBPF program receives the link notification packets and changes the local ingress and egress rule to use the locator indicated in the packet. The monitor keeps track of local access network locators and issues the notification message to the connecting peer. When one endpoint 130 moves out of a network area, its monitor will detect a link drop and send the notification to its peer, and vice versa.

Deployment Considerations

In some embodiments, the LLP system 110 relies on Segment Routing (SR). For service providers, SR has the potential to reduce implementation and operation complexity, enable greater programmability and improved traffic engineering, and enhance scalability and service agility by eliminating the need for maintaining state in every part of the network. Segment Routing has been under development for many years with maturing standards. Its adoption is expected to accelerate and will likely facilitate wide-scale deployment of instance of the LLP system 110 in service providers' networks in the coming years.

eBPF is one of the other key technologies leveraged in some embodiments of the disclosure and already has wide Linux deployment. For other endpoints that do not support eBPF, a somewhat limited version of the solution that operates completely from within the network can still be deployed since much of the disclosure can be implemented in SRv6 edge routers and gateways. This includes the mechanisms for dynamic network and locator updates, disruption-free network switching in the downlink direction for ongoing connections, and VIP-to-locator resolution for initial connection setup. Switching networks for ongoing connections may need endpoint support (such as eBPF) only in the uplink direction.

In certain embodiments, the present disclosure is a system having a tree structure comprising a root node connected to a plurality of leaf nodes via a plurality of intermediate nodes. Each leaf node and each intermediate node has a corresponding parent node in the tree structure, and the root node and each intermediate node has at least one corresponding child node in the tree structure. A first leaf node is configured to communicate with a destination endpoint via a first access network, wherein the first leaf node is configured to store a first mapping from a permanent virtual IP (VIP) address for the destination endpoint to a first physical IP (PIP) address for the destination endpoint on the first access network. A second leaf node is configured to communicate with the destination endpoint via a second access network different from the first access network, wherein the second leaf node is configured to store a second mapping from the VIP address for the destination endpoint to a second PIP address for the destination endpoint on the second access network, the second PIP address being different from the first PIP address. The root node is configured to store (i) a first root-node pointer pointing to a first intermediate node for the destination endpoint and the first access network and (ii) a second root-node pointer pointing to either the first intermediate node or a different intermediate node for the destination endpoint and the second access network. The first intermediate node is configured to store at least a first intermediate-node pointer pointing to a first child node for the destination endpoint and the first access network, wherein the first intermediate node is configured to use at least the first intermediate-node pointer to forward, towards the destination endpoint, a connection setup request (CSR) for the destination endpoint received from a corresponding node.

In at least some of the above embodiments, the root node and the first intermediate node are unaware of the first and second PIP addresses for the destination endpoint.

In at least some of the above embodiments, the root node is configured to (i) receive the CSR from a second intermediate node and (ii) use at least the first root-node pointer to forward the CSR to the first intermediate node.

In at least some of the above embodiments, each of the root node, the first intermediate node, and the first and second leaf nodes are configured to store a value indicating the number of access networks for the destination endpoint.

In at least some of the above embodiments, the second root-node pointer points to the first intermediate node, and the first intermediate node is configured to store (i) the first intermediate-node pointer pointing to the first child node for the destination endpoint and the first access network and (ii) a second intermediate-node pointer pointing to a second child node for the destination endpoint and the second access network.

In at least some of the above embodiments, the second root-node pointer points to the other intermediate node, and the other intermediate node is configured to store a second intermediate-node pointer pointing to a second child node for the destination endpoint and the second access network.

In at least some of the above embodiments, the CSR identifies the VIP address for the destination endpoint, but not any PIP address for the destination endpoint.

In at least some of the above embodiments, the CSR identifies at least one PIP address for the corresponding node.

In at least some of the above embodiments, the CSR has an IP destination address as the VIP address of the destination endpoint when anycast-based service discovery is used.

In at least some of the above embodiments, the CSR has an IP destination address as the PIP address of a closest leaf node in the tree structure when DNS-based service discovery is used.

In at least some of the above embodiments, a third leaf node different from at least the first leaf node is configured to (i) receive the CSR from the corresponding node and (ii) pass the CSR up to its parent node, and the system is configured to pass the CSR up to a lowest common ancestor (LCA) node for the first, second, and third leaf nodes.

In at least some of the above embodiments, the system is configured not to pass the CSR up to a parent node of the LCA node.

In at least some of the above embodiments, the first leaf node is configured to retain the CSR for a period of time to enable the first leaf node to re-transmit the CSR a second time to the destination endpoint via the first access network.

In certain embodiments, the present disclosure is a destination endpoint comprising (i) a first interface configured to communicate via a first access network with a first leaf node of a system having a tree structure and (ii) a second interface configured to communicate via a second access network, different from the first access network, with a second leaf node of the system, different from the first leaf node. The destination endpoint is configured to receive, at the first interface, a first copy of a connection setup request (CSR) transmitted by a corresponding node to the system and then transmitted by the first leaf node to the destination endpoint, and the destination endpoint is configured to receive, at the second interface, a second copy of the CSR transmitted by the second leaf node to the endpoint.

In at least some of the above embodiments, the destination endpoint is configured to use a first-received copy of the CSR and to ignore a second-received copy of the CSR.

In at least some of the above embodiments, the CSR identifies at least one physical IP (PIP) address for the corresponding node, and the destination endpoint is configured to transmit a reply message to the corresponding node using the at least one PIP address for the corresponding node.

In at least some of the above embodiments, the destination endpoint is configured to transmit the reply message to the corresponding node independent of the system.

In at least some of the above embodiments, the destination endpoint is configured to be assigned a permanent virtual IP (VIP) address that is independent of the first and second access networks.

Although not explicitly shown in the figures, each node in the figures has at least one processor (e.g., a CPU) for processing incoming and/or outgoing data, memory (e.g., RAM, ROM) for storing data and (in some implementations) program code to be executed by the processor, and communication hardware (e.g., transceivers) for communicating with one or more other nodes.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A system having a tree structure comprising a root node connected to a plurality of leaf nodes via a plurality of intermediate nodes, wherein:
    each leaf node and each intermediate node has a corresponding parent node in the tree structure;
    the root node and each intermediate node has at least one corresponding child node in the tree structure;
    a first leaf node is configured to communicate with a destination endpoint via a first access network, wherein the first leaf node is configured to store a first mapping from a permanent virtual IP (VIP) address for the destination endpoint to a first physical IP (PIP) address for the destination endpoint on the first access network;
    a second leaf node is configured to communicate with the destination endpoint via a second access network different from the first access network, wherein the second leaf node is configured to store a second mapping from the VIP address for the destination endpoint to a second PIP address for the destination endpoint on the second access network, the second PIP address being different from the first PIP address;
    the root node is configured to store (i) a first root-node pointer pointing to a first intermediate node for the destination endpoint and the first access network and (ii) a second root-node pointer pointing to either the first intermediate node or a different intermediate node for the destination endpoint and the second access network; and
    the first intermediate node is configured to store at least a first intermediate-node pointer pointing to a first child node for the destination endpoint and the first access network, wherein the first intermediate node is configured to use at least the first intermediate-node pointer to forward, towards the destination endpoint, a connection setup request (CSR) for the destination endpoint received from a corresponding node.

2. The system of claim 1, wherein the root node and the first intermediate node are unaware of the first and second PIP addresses for the destination endpoint.

3. The system of claim 1, wherein the root node is configured to (i) receive the CSR from a second intermediate node and (ii) use at least the first root-node pointer to forward the CSR to the first intermediate node.

4. The system of claim 1, wherein each of the root node, the first intermediate node, and the first and second leaf nodes are configured to store a value indicating the number of access networks for the destination endpoint.

5. The system of claim 1, wherein:
    the second root-node pointer points to the first intermediate node; and
    the first intermediate node is configured to store (i) the first intermediate-node pointer pointing to the first child node for the destination endpoint and the first access network and (ii) a second intermediate-node pointer pointing to a second child node for the destination endpoint and the second access network.

6. The system of claim 1, wherein:
    the second root-node pointer points to the other intermediate node; and
    the other intermediate node is configured to store a second intermediate-node pointer pointing to a second child node for the destination endpoint and the second access network.

7. The system of claim 1, wherein the CSR identifies the VIP address for the destination endpoint, but not any PIP address for the destination endpoint.

8. The system of claim 1, wherein the CSR identifies at least one PIP address for the corresponding node.

9. The system of claim 1, wherein the CSR has an IP destination address as the VIP address of the destination endpoint when anycast-based service discovery is used.

10. The system of claim 1, wherein the CSR has an IP destination address as the PIP address of a closest leaf node in the tree structure when DNS-based service discovery is used.

11. The system of claim 1, wherein:
    a third leaf node different from at least the first leaf node is configured to (i) receive the CSR from the corresponding node and (ii) pass the CSR up to its parent node; and
    the system is configured to pass the CSR up to a lowest common ancestor (LCA) node for the first, second, and third leaf nodes.

12. The system of claim 11, wherein the system is configured not to pass the CSR up to a parent node of the LCA node.

13. The system of claim 1, wherein the first leaf node is configured to retain the CSR for a period of time to enable the first leaf node to re-transmit the CSR a second time to the destination endpoint via the first access network.

14. A method for a system having a tree structure comprising a root node connected to a plurality of leaf nodes via a plurality of intermediate nodes, wherein:
    each leaf node and each intermediate node has a corresponding parent node in the tree structure; and
    the root node and each intermediate node has at least one corresponding child node in the tree structure, the method comprising:
    a first leaf node communicating with a destination endpoint via a first access network, wherein the first leaf node stores a first mapping from a permanent virtual IP (VIP) address for the destination endpoint to a first physical IP (PIP) address for the destination endpoint on the first access network;
    a second leaf node communicating with the destination endpoint via a second access network different from the first access network, wherein the second leaf node stores a second mapping from the VIP address for the destination endpoint to a second PIP address for the destination endpoint on the second access network, the second PIP address being different from the first PIP address;

the root node stores (i) a first root-node pointer pointing to a first intermediate node for the destination endpoint and the first access network and (ii) a second root-node pointer pointing to either the first intermediate node or a different intermediate node for the destination endpoint and the second access network; and the first intermediate node stores at least a first intermediate-node pointer to a first child node for the destination endpoint and the first access network, wherein the first intermediate node uses at least the first intermediate-node pointer to forward, towards the destination endpoint, a connection setup request (CSR) for the destination endpoint received from a corresponding node.

15. A destination endpoint comprising:

a first interface configured to communicate via a first access network with a first leaf node of a system having a tree structure; and a second interface configured to communicate via a second access network, different from the first access network, with a second leaf node of the system, different from the first leaf node, wherein:

the destination endpoint is configured to receive, at the first interface, a first copy of a connection setup request (CSR) transmitted by a corresponding node to the system and then transmitted by the first leaf node to the destination endpoint; and the destination endpoint is configured to receive, at the second interface, a second copy of the CSR transmitted by the second leaf node to the endpoint.

16. The endpoint of claim 15, wherein the destination endpoint is configured to use a first-received copy of the CSR and to ignore a second-received copy of the CSR.

17. The endpoint of claim 15, wherein:

the CSR identifies at least one physical IP (PIP) address for the corresponding node; and the destination endpoint is configured to transmit a reply message to the corresponding node using the at least one PIP address for the corresponding node.

18. The endpoint of claim 17, wherein the destination endpoint is configured to transmit the reply message to the corresponding node independent of the system.

19. The endpoint of claim 15, wherein the destination endpoint is configured to be assigned a permanent virtual IP (VIP) address that is independent of the first and second access networks.

* * * * *